(12) United States Patent
Bourbon et al.

(10) Patent No.: US 7,592,737 B2
(45) Date of Patent: Sep. 22, 2009

(54) MEMS DEVICE COMPRISING AN ACTUATOR GENERATING A HYSTERESIS DRIVING MOTION

(75) Inventors: Gilles Bourbon, Besancon (FR); Cyrille Hibert, Saint-George (FR); Eric Joseph, Chaucenne (FR); Patrice Le Moal, Besancon (FR); Patrice Minotti, Gennes (FR)

(73) Assignees: Universite de Franche-Comte (FR); Centre National de la Recherche Scientifique (CNRS) (FR)

( * ) Notice: Subject to any disclaimer, the term of this patent is extended or adjusted under 35 U.S.C. 154(b) by 0 days.

(21) Appl. No.: 10/548,214

(22) PCT Filed: Mar. 5, 2004

(86) PCT No.: PCT/FR2004/000525

§ 371 (c)(1),
(2), (4) Date: Aug. 15, 2006

(87) PCT Pub. No.: WO2004/081695

PCT Pub. Date: Sep. 23, 2004

(65) Prior Publication Data
US 2007/0069604 A1    Mar. 29, 2007

(30) Foreign Application Priority Data
Mar. 5, 2003    (FR) .................................. 03 02697

(51) Int. Cl.
*H02N 2/00*    (2006.01)
(52) U.S. Cl. ........................................ 310/309; 310/311

(58) Field of Classification Search ................... None
See application file for complete search history.

(56) References Cited

U.S. PATENT DOCUMENTS 3,645,089 A    2/1972    Yamada (Continued)

FOREIGN PATENT DOCUMENTS

DE    2216821 A    10/2002

(Continued)

OTHER PUBLICATIONS

Renard, "Industrial MEMS on SOI", Journal of Micromechanics & Microengineering, vol. 10, No. 2, pp. 245-249, Sep. 27, 1999, IOP Publishing Ltd.

(Continued)

*Primary Examiner*—Quyen Leung
*Assistant Examiner*—Bryan P Gordon
(74) *Attorney, Agent, or Firm*—Lerner, David, Littenberg, Krumholz & Mentlik, LLP

(57)    ABSTRACT

A MEMS device is provided which includes a driven element having a series of teeth. The MEMS device includes a driving element operable to engage the driven element when the driving element is in a meshed position with the series of teeth. A driving actuator of the MEMS device is operable to (i) move the driving element with a hysteresis-type motion from an initial position into the meshed position to engage the driven element, (ii) move the driving element causing the driven element to move while the driving element is in the meshed position, (iii) move the driving element away from the meshed position, and (iv) cause the driving element to return to the initial position while the driving element is not in the meshed position.

12 Claims, 15 Drawing Sheets

U.S. PATENT DOCUMENTS

| | | | | | |
|---|---|---|---|---|---|
| 4,978,104 | A | * | 12/1990 | Gipson, Jr. | 254/420 |
| 5,495,761 | A | * | 3/1996 | Diem et al. | 73/514.32 |
| 5,631,514 | A | * | 5/1997 | Garcia et al. | 310/309 |

FOREIGN PATENT DOCUMENTS

| | | | |
|---|---|---|---|
| JP | 05038165 | * | 2/1993 |
| WO | WO-01/09519 A | | 2/2001 |

OTHER PUBLICATIONS

MacDonald, "Scream MicroElectroMechanical Systems", Microelectronic Engineering, vol. 32, No. 1/4, pp. .49-73, Sep. 1, 1996, Elsevier Publishers.

Lee et al., "The Surface/Bulk Micromachining (SBM) Process: A New Method for Fabricating Released MEMS in Single Crystal Silicon", Journal of Microelectromechanical Systems, vol. 8, No. 4, Dec. 1999, IEEE Inc.

Ayazi et al., "High Aspect-Ratio Combined Poly and Single-Crystal Silicon (HARPSS) MEMS Technology", Journal of Microelectromechanical Systems, vol. 9, No. 3, pp. 288-294, Sep. 1, 2000, IEEE.

Sniegowski, "Moving the world with surface micromachining", Solid State Technology, vol. 39, No. 2, pp. 83-84, 87-88, 90, Feb. 1996.

Paten Abstract of Japan, vol. 009, No. 262, Oct. 19, 1985 & JP 60 111178 (Suwa Seikosha KK) Jun. 17, 1985.

Miller et al., "Failure Modes in Surface Micromachined MicroElectroMechanical Actuators", 36th Annual International Reliability Physics Symposium Proceedings, pp. 17-25, Mar. 31, 2008, IEEE.

Yeh et al., "Single Mask. Large Force, And Large Displacement Electrostatic Linear Inchworm Motors", Berkeley Sensor and Actuator Center, Dept. of Electrical Engineering and Computer Science, University of California, Berkeley, CA, 94720, Jan. 2001.

* cited by examiner

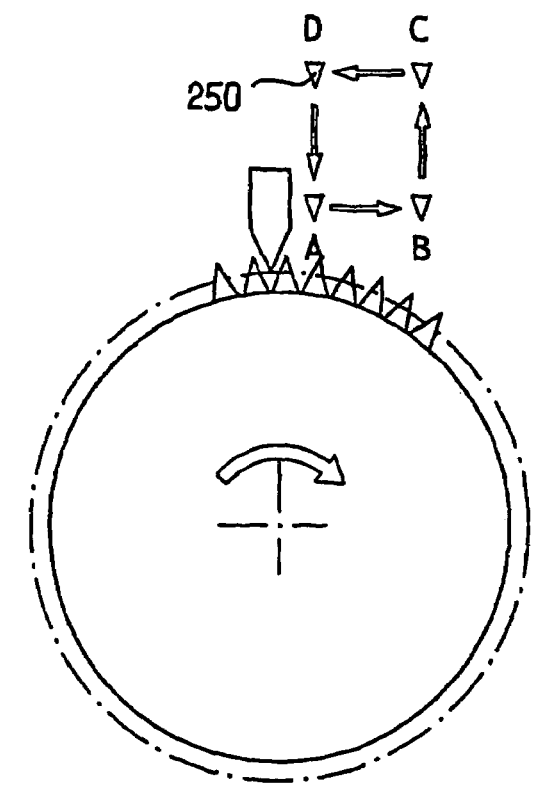
FIG.4
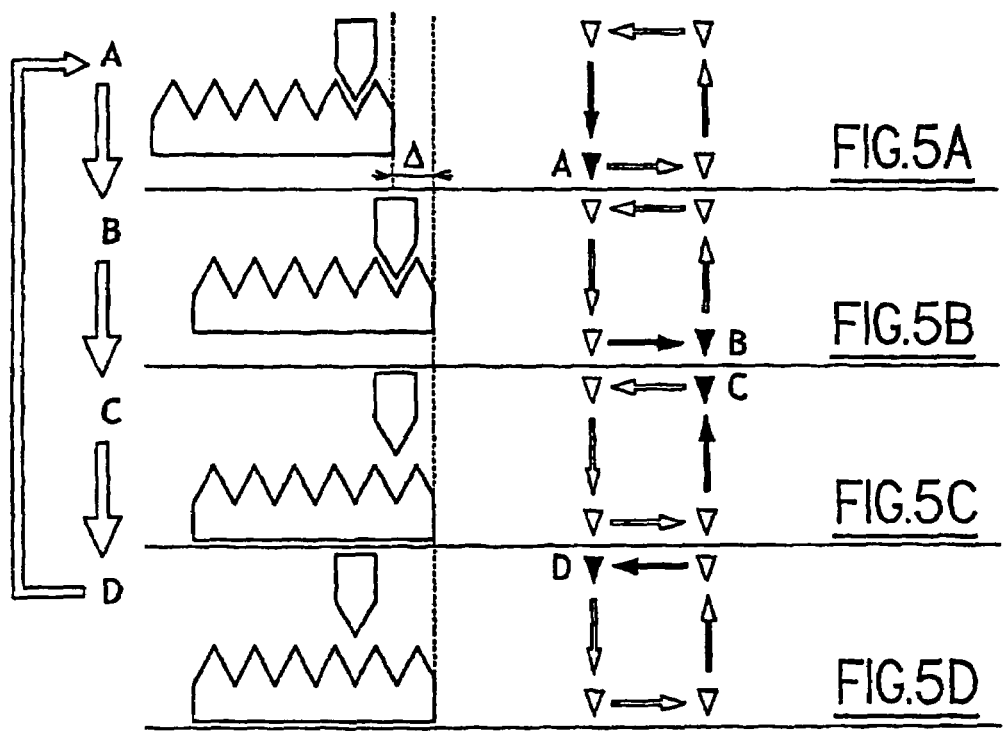
FIG.5A
FIG.5B
FIG.5C
FIG.5D

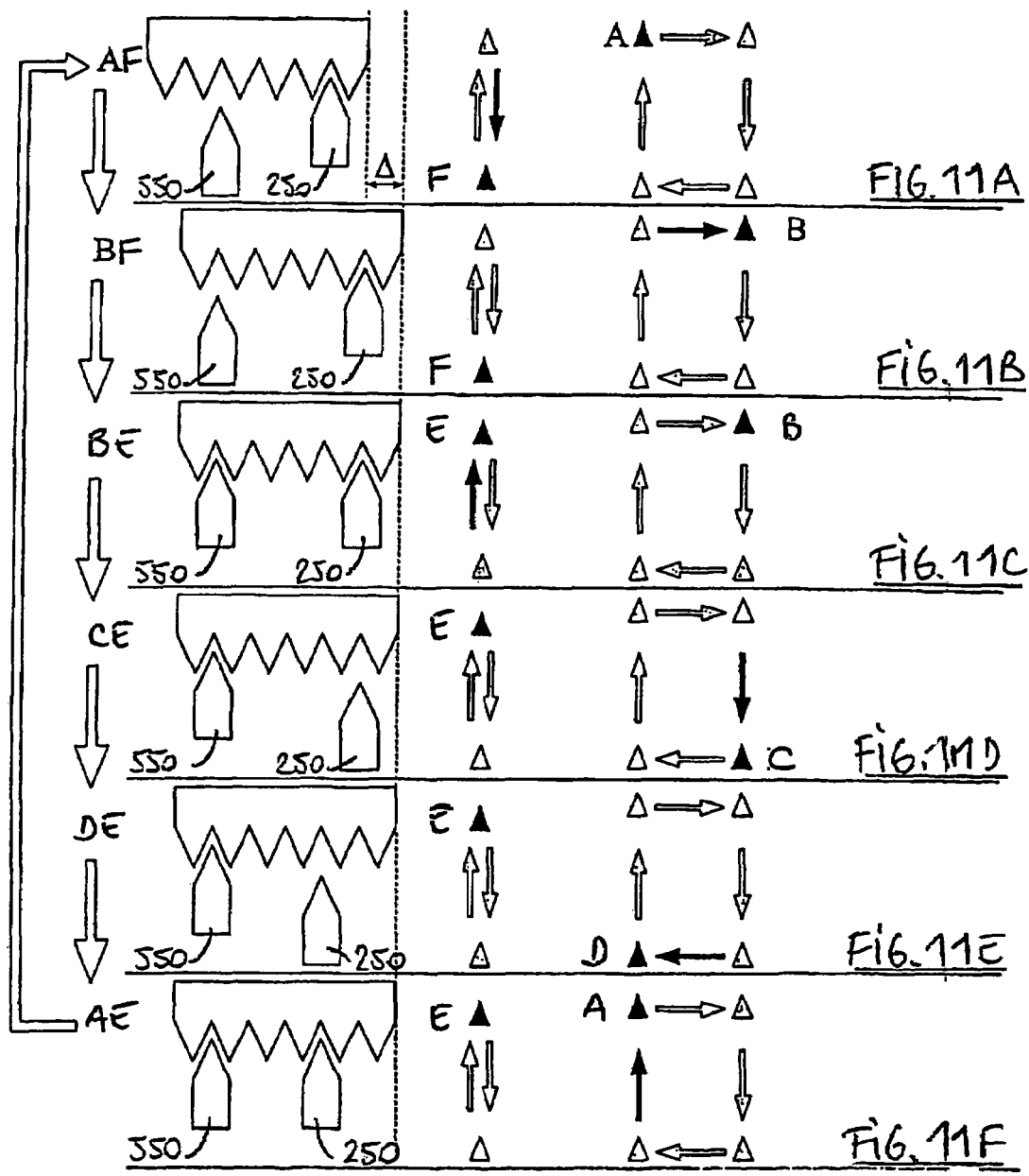

MEMS DEVICE COMPRISING AN ACTUATOR GENERATING A HYSTERESIS DRIVING MOTION

BACKGROUND OF THE INVENTION

The invention concerns the area of electromechanical Microsystems (MEMS or microelectric Microsystems), and more particularly, the micromotors and microgearboxes obtained by deep etching in a substrate of semiconductor material.

Document U.S. Pat. No. 5,631,514 (published on 20 May 1997) describes a micromotor capable of driving a toothed wheel in rotation. The micromotor includes a toothed output element meshing with the toothed wheel, an element forming a connecting rod connected to the output element and interdigital comb-type electrostatic actuators (also known as comb drives) controlling the movement of the element forming a connecting rod. The combined movements of the actuators drive the rotation of the toothed output element.

The various elements making up the micromotor described in this document extend into different planes of the substrate. As a consequence, the manufacture of the micromotor necessitates the etching of a substrate formed from a stack of thin layers and the use of several successive etching masks. Manufacture of the micromotor by means of surface micromachining of the polycrystalline silicon is consequently relatively complex.

Document WO 01/09519 (published on 8 Feb. 2001) describes a MEMS microvalve that includes a shutter element driven in rotation by electrostatic actuators of the comb drive type. The electrostatic actuators act upon the shutter element by friction.

The micromechanism described in the said document does not allow precise control of the positioning or of the speed of the controlled element.

Furthermore, the devices described in documents U.S. Pat. No. 5,631,514 and WO 01/09519 are obtained by surface microetching, that is on thin layers of silicon with a thickness of less than 4 µm. Because of their small thickness, the elements making up these devices are not able to support large deformations. The device structures proposed in those documents are therefore not suitable for the driving of elements with a large driving pitch (10 µm or more), which does not allow one to envisage the coupling of these driving devices with conventional gear trains in areas such as watchmaking.

The document entitled "Single mask, large force, and large displacement electrostatic linear inchworm motors", Richard YEH, Seth HOLLAR, Kristofer S. J. PISTER (January 2001) describes a micromotor capable of driving a toothed rack device in linear motion. The micromotor is obtained by deep etching in a layer of silicon with a thickness of between 15 and 50 µm. This micromotor is formed from two electrostatic actuators of the comb-drive type connected in series. The combined movements of the actuators drive the rack device in linear motion.

In such an actuator, the movement is obtained by the normal electrostatic force generated between the fingers of the interdigital combs. Now this normal force is dependent on the overlapping area between the fingers and also on the distance between the fingers. The distance between the fingers must be sufficiently low so that the electrostatic force generated is significant. As a consequence, such an actuator necessarily has limited pitch (about 2 µm).

The structure of the actuator proposed in the said document is not suitable for the driving of toothed elements with a pitch of 10 µm or more. Thus, neither does this actuator allow one to envisage the coupling of the driving device with conventional gear trains.

SUMMARY OF THE INVENTION

One aim of the present invention is to provide an actuating mechanism of very small size and with a larger pitch than the devices of earlier design.

According to an aspect of the invention, a micro-electromechanical system (MEMS) device is provided. The MEMs device includes a driven element having a series of teeth. The MEMs device includes a driving element which is operable to engage the driven element when the driving element is in a meshed position with the series of teeth. A driving actuator of the MEMS device is operable to (i) move the driving element with a hysteresis-type motion from an initial position into the meshed position to engage the driven element, (ii) move the driving element causing the driven element to move while the driving element is in the meshed position, (iii) move the driving element away from the meshed position, and (iv) cause the driving element to return to the initial position while the driving element is not in the meshed position. The driving actuator has a fixed comb and a mobile comb, each of the fixed and mobile combs including a series of fingers. The mobile comb is located opposite the fixed comb and the fingers of the fixed comb and fingers of the mobile comb mesh with each other. The mobile comb is displaceable in a first direction relative to the fixed comb by applying a potential difference between the fixed comb and the mobile comb to move the driving element in the first direction.

According to one or more preferred aspects of the invention, the first direction is a direction parallel to a direction in which the series of fingers extend from the fixed comb and mobile comb.

According to one or more preferred aspects of the invention, the driving actuator includes a first actuating module operable to move the driving element in the first direction and a second actuating module operable to move the driving element in a second direction. The first direction is a tangential direction tangential to the series of teeth, and the second direction is a radial direction oriented radially with respect to the series of teeth. The first and second actuating modules are controllable simultaneously to move the driving element with the hysteresis-type motion.

According to one or more preferred aspects of the invention, a first flexible rod extends in the first direction to connect the first actuating module with the driving element and a second flexible rod extends in the second direction to connect the second actuating module with the driving element. The first and second actuating modules are operable to independently move the first and second flexible rods, respectively, to move the driving element with the hysteresis-type motion.

According to one or more preferred aspects of the invention, the first and second actuating modules are controllable by first and second periodic signals, respectively.

According to one or more preferred aspects of the invention, the second periodic signal is shifted in phase relative to the first periodic signal by less than about half of a period of the first periodic signal.

According to one or more preferred aspects of the invention, the driving actuator is operable to maintain the driving element in the meshed position when no signal is applied to the actuator.

According to one or more preferred aspects of the invention, the MEMS device further includes a referencing element operable to engage the driving element when the referencing element is in a meshed position with the series of teeth. In addition, the MEMS device further includes a referencing actuator operable to move the referencing element into the meshed position in synchronism with the hysteresis-type motion of the driving element to selectively engage the referencing element with the driven element to maintain a position of the driving element when the driving element is disengaged from the driven element.

According to one or more preferred aspects of the invention, the referencing actuator is controllable by one or more periodic signals synchronized with the first and second periodic signals.

According to one or more preferred aspects of the invention, the driven element includes a wheel and the series of teeth are disposed at an exterior surface of the wheel.

According to one or more preferred aspects of the invention, the wheel is directly attached to an indicator such that the indicator is movable by the driving element, the indicator including at least one of a needle or a hand.

BRIEF DESCRIPTION OF THE DRAWINGS

FIG. 4 represents the hysteresis movement imparted to a driving element in relation to the wheel during a cycle.

FIGS. 5A to 5D show the positions A, B, C and D adopted by the driving element in relation to the teeth of the wheel, and the elementary advance Δ produced by one movement cycle of the driving element.

FIGS. 11A to 11F show the positions A, B, C and D adopted by the driving element in relation to the teeth of the wheel and the positions E and F adopted by the referencing element.

DETAILED DESCRIPTION

Figure 1:
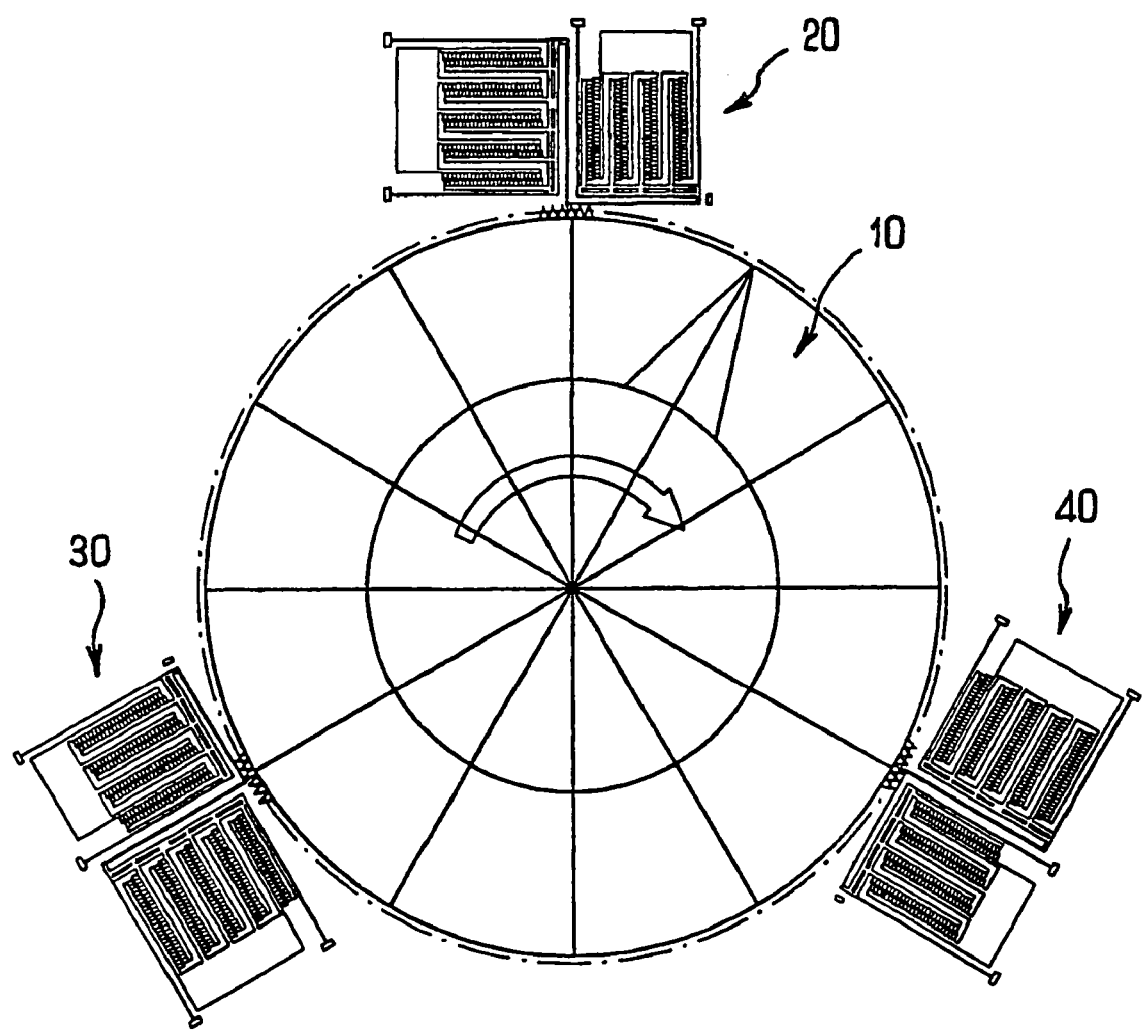
FIG. 1 schematically illustrates an exemplary structure of a clock device in accordance with an embodiment of the invention.

To this end, in one embodiment of the invention a self-assembled device is formed by etching a block of semiconductor material. Etching can, for example, take place in a thickness greater than 10 μm, where the device includes the following elements:

a toothed driven element, a driving element capable of sequentially meshing with the toothed driven element, an actuator capable of moving the driving element with a hysteresis-type motion so that the driving element meshes with successive teeth of the driven element, where the actuator includes an actuating module that itself includes at least one fixed comb and one mobile comb, where each comb includes a series of fingers, the mobile comb being located opposite to the fixed comb so that fingers of the fixed comb and fingers of the mobile comb mesh with each other, characterised in that the mobile comb is capable of being moved in relation to the fixed comb along a direction parallel to the fingers of the combs during the application of a potential difference between the fixed comb and the mobile comb, so as to move the driving element in a corresponding direction.

In the context of this present invention, the expression "self-assembled" refers to a system that is free of any assembly manipulation and/or operation in the manufacture of the product.

The actuator of the device of the invention creates tangential electrostatic forces which are applied between the fingers of the fixed and mobile combs. This is how the interdigital fixed and mobile combs are moved in relation to each other in a direction parallel to the fingers of the combs. Such a solution results in larger movement amplitudes of the driving element than would be obtained with the interdigital comb actuators that use only the normal electrostatic forces.

Moreover, so that the device can support such movement amplitudes of the driving element, the etching employed is of the deep type (etching thickness greater than 10 μm). Thus, the various elements of the device have thicknesses that are sufficient to avoid the induction of parasitic movements (buckling) when they are subjected to force.

In particular, the creation of elements with lateral dimensions (meaning dimensions in the plane of movement of the various elements) of the order of one millimetre requires that the thickness of the elements (corresponding to the etching thickness) should be sufficient to prevent any buckling.

In the device of the invention, the movement of the driven element is generated by a driving element which is displaced with a hysteresis-type motion. The consequence is that the driven element is displaced in a stepping movement, with a step of more than 10 μm.

The presence of teeth on the driven element allows accurate referencing of its positioning.

This device can thus be used advantageously as a clock device.

This device requires no reduction gear or vernier system. The driving element is therefore smaller than the conventional devices.

All of the elements of the device are formed using MEMS technology, by etching in a block of semiconductor material. The device thus forms an integrated component, whose functions are all created in a single etching operation.

In an advantageous implementation of the invention, the device also includes the following:

a referencing element capable of meshing sequentially with the toothed wheel, an actuator capable of moving the referencing element with a movement that is synchronised with the hysteresis movement of the driving element, so that the referencing element meshes with the teeth of the wheel when the driving element is not meshing with teeth of the wheel, in order to keep the wheel in position.

As illustrated in FIG. 1, in a micro-electromechanical system (MEMs) device according to an embodiment of the invention, the device includes a circular toothed wheel 10 capable of being driven in rotation by three driving actuators 20, 30, 40 distributed around the wheel and forming angles of 120 degrees to each other.

The device of FIG. 1 has the particular feature of being an integrated device. The elements making up the device are formed simultaneously by etching in a single block of semiconductor material. The portion of block that is etched has a thickness of more than 10 μm. The portion of block that is not etched, and that is supporting all of the elements, constitutes the substrate.

Figure 2:
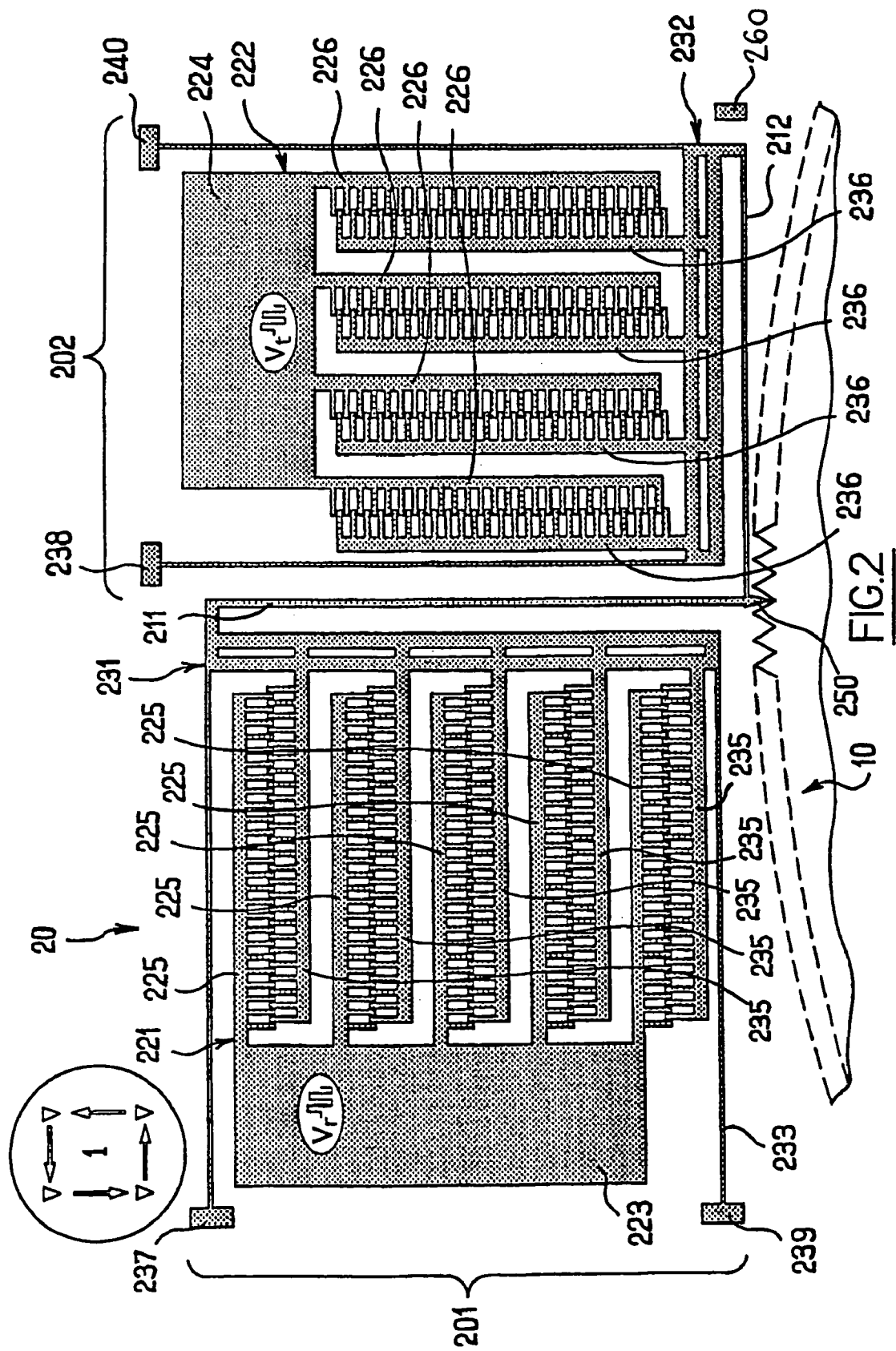
FIG. 2 shows, in greater detail, an actuator for driving the device of FIG. 1.

FIG. 2 shows one of the driving actuators 20 of FIG. 1 in greater detail. The driving actuator 20 is composed mainly of an elementary radial actuating module 201, an elementary tangential actuating module 202, and a driving element in the form of a tooth 250.

The driving tooth 250 has a triangular shape. It extends close to the wheel 10 with the point directed at the wheel, in a radial direction in relation to the latter. The driving tooth 250 is thus capable of meshing with the teeth of the wheel 10.

In the remainder of the document, the expression "radial" refers to any element extending in a radial direction in relation to the wheel 10 and the expression "tangential" refers to any element extending in a tangential direction in relation to the wheel, the radial and tangential directions being established at the point of the wheel at which the driving tooth is located.

The expression "fixed" refers to any element embedded in the substrate, and the expression "mobile" refers to any element held a few microns above the substrate by the elastic suspension means which are also embedded in the substrate.

The driving tooth 250 is connected by a radial rod 211 to the radial actuating module and by a tangential rod 212 to the tangential actuating module.

The radial 201 and tangential 202 actuating modules are electrostatic modules with a comb structure (also known as a "comb drive"). This type of structure includes pairs of interdigital combs.

The radial 201 and tangential 202 actuating modules of the actuator structure 20 will now be described in greater detail.

The radial actuating module 201 is formed from a fixed part 221 and a mobile part 231 to which the radial rod 211 is connected.

The fixed part 221 includes a radial electrode 223 from which a fixed set of parallel combs 225 extend in a tangential direction. Each comb 225 is formed from a main rod and a series of parallel fingers or cilia connected to the rod and extending perpendicularly in relation to the latter.

The mobile part 231 includes a mobile frame 233 that has a general U shape and that extends around the fixed part 221. The mobile frame 233 is connected at each of its ends to the substrate, by means of embedding links 237, 239 comprising the elastic suspensions. Combs 235 extend from the mobile frame 233 in a general radial direction. These combs 235 are formed from a main rod and a series of parallel fingers or cilia connected to the rod and extending perpendicularly to the latter.

The combs 225 of the fixed part 221 and the combs 235 of the mobile part 231 are positioned parallel to each other and interleaved with each other. Furthermore, each mobile comb 235 is located facing a fixed comb 225 so that their fingers interleave with each other, thus forming a pair of combs which are described as "interdigited" combs.

The tangential actuating module 202 has a structure similar to that of the radial actuating module 201, except that it is oriented perpendicularly to the latter. It is formed from a fixed part 222 and a mobile part 232 to which the tangential rod 211 is connected.

The fixed part 222 includes a tangential electrode 224 from which a set of parallel fixed combs 226 extend in a radial direction.

The mobile part 232 includes a mobile frame 232 connected at each of its ends to the substrate by means of embedding links 238, 240 comprising the elastic suspensions. Combs 236 extend from the mobile frame 232 in a general tangential direction.

The combs 226 of the fixed part 222 and the combs 236 of the mobile part 232 are positioned parallel to each other and interleaved with each other. Furthermore, each mobile comb 236 is located facing a fixed comb 226 so that their fingers mesh with each other, thus forming a pair of interdigital combs.

The operation of the radial and tangential modules will now be described.

The interleaved fingers of the interdigital combs are similar to flat capacitors, one of whose plates is connected to the electrode 223 or 222, with the other plate being connected to ground via the embedding links 237, 239 or 238, 240.

When a voltage is applied to the radial electrode 223, this voltage creates a potential difference between the fixed part 221 and the mobile part 231 of the actuating module 201. An electric field is established between the plates of the capacitors formed by the fingers of the combs 225 and 235. This electric field generates a tangential electrostatic force which tends to move the mobile combs 235 in relation to the fixed combs 225 in a direction parallel to the fingers of the combs, and of moving the driving element 250 in a corresponding direction.

The tangential electrostatic force acting between the fingers of the combs leads to the deformation of the frame 233 and, as a consequence, to linear motion of the driving tooth 250 by the action of the rod 211 in a radial direction in relation to the wheel 10. The frame 233 allows movement of the mobile combs 235 in the direction of the fingers only.

In like manner, the same phenomenon occurs when a voltage is applied to electrode 224. The electrostatic force created results in deformation of the frame 232 and the linear motion of the driving tooth 250 by the action of the rod 212 in a tangential direction in relation to the wheel 10. The frame 232 allows a movement of the mobile combs 236 only in the direction of the fingers.

The tangential actuating module 202 includes a stop element 260 used to limit the amplitude of the movement of the mobile frame in order to keep the mobile part 232 away from the fixed part 222 and so prevent the mobile combs 236 from coming into contact with the fixed combs 226. In fact, any contact of the combs would generate an excessively large normal electrostatic force between the combs, and could lead to the collapse of the device.

For its part, the movement of the frame of the radial actuating module 201 is limited by the presence of the toothed wheel 10, which limits the movement of the driving tooth 250 in the radial direction.

It will be noted that the lateral flexibility of each of the rods allows the deformation of the latter by the action of the other rod. The two radial and tangential flexible rods 211 and 212 cause a mechanical decoupling of the two actuating modules 201 and 202. In fact, the flexibility of the rods allows a movement of the driving tooth independently, with two elementary degrees of freedom, namely in the two directions of radial and tangential linear motion.

The decoupling of the actuating modules 201 and 202 allows these to move into a parallel configuration. The parallel configuration of the two actuating modules 201 and 202 (as opposed to a series configuration) improves access to the electrodes 223 and 224 for the installation of power connections.

FIGS. 3A to 3D illustrate the successive operating stages of the actuator 20, used to generate a cyclic hysteresis movement of the driving tooth 250.

Figure 3A:
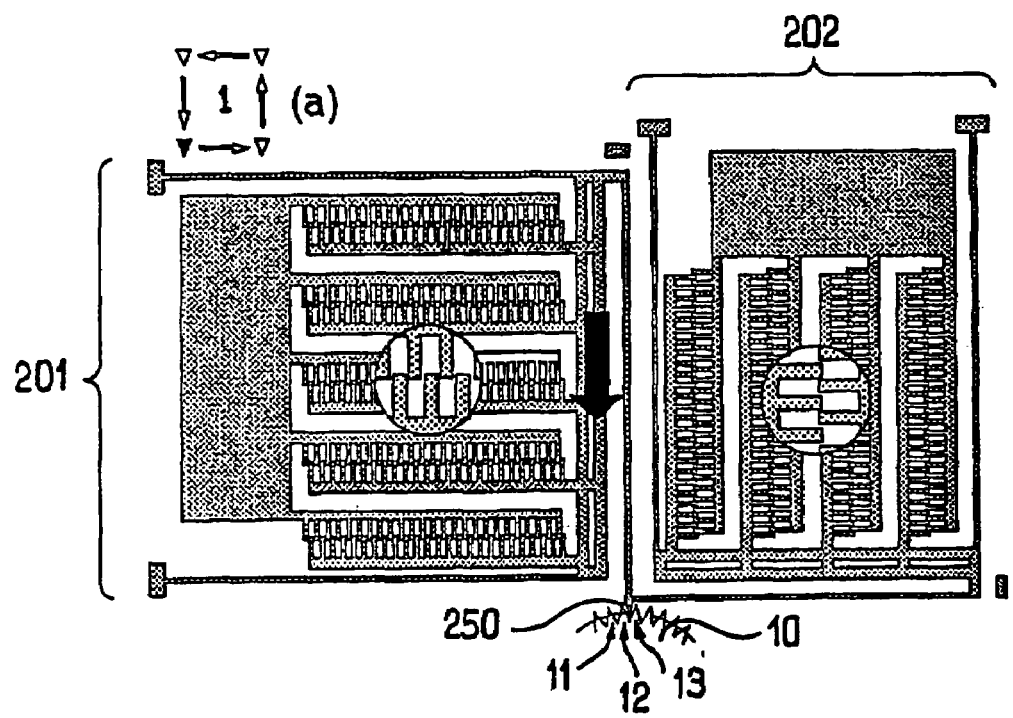
FIGS. 3A to 3D schematically illustrate the successive operating stages of the driving actuator.

In FIG. 3A, the elementary radial actuating module 201 and the elementary tangential actuating module 202 are at rest. At this stage, the driving tooth 250 is positioned between teeth 12 and 13 of the toothed wheel 10.

Figure 3B:
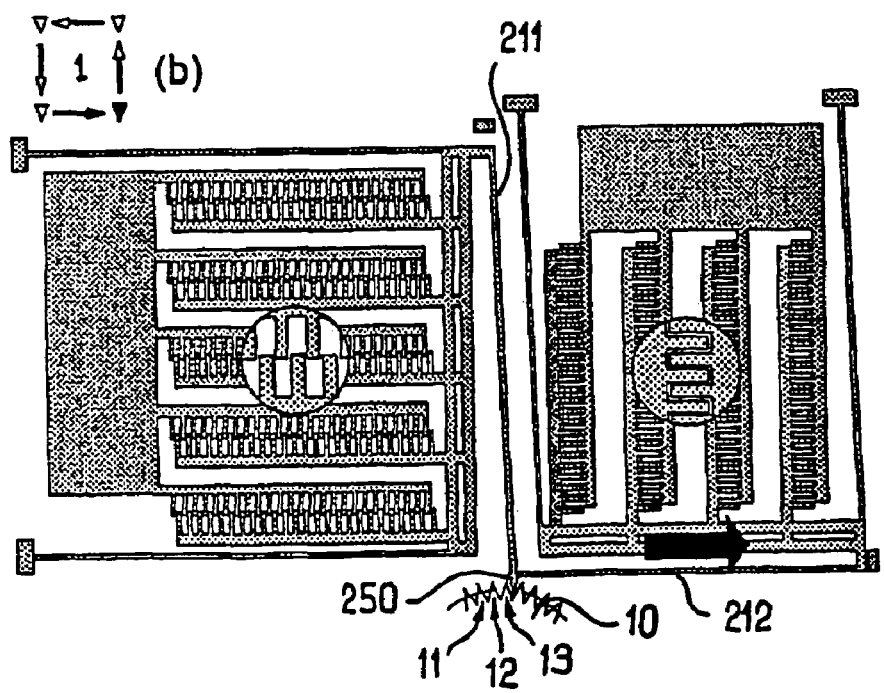

In FIG. 3B, the tangential actuating module 202 is controlled so as to exert a tangential force on the driving tooth 250 by means of the tangential rod 212. The tooth 250 is then displaced tangentially to the wheel 10, in a clockwise direction (as indicated by the arrow). The rod 211 is deformed. At this stage the driving tooth 250 meshes with tooth 13 of the wheel 10 and drives the latter in rotation.

Figure 3C:
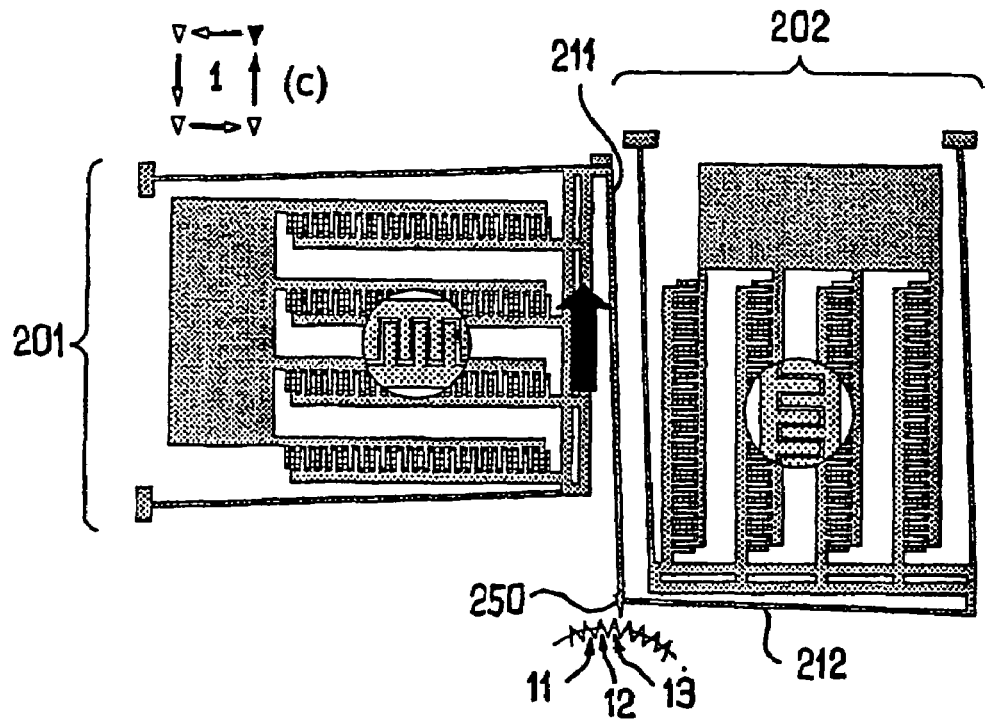

In FIG. 3C, the radial actuating module 201 is controlled so as to exert a radial force on the driving tooth by means of the radial rod 211. At this stage, the driving tooth 250 is distanced from the wheel 10 (as indicated by the arrow) so that it no longer meshes with the latter. The tooth 250 is then disengaged.

Figure 3D:
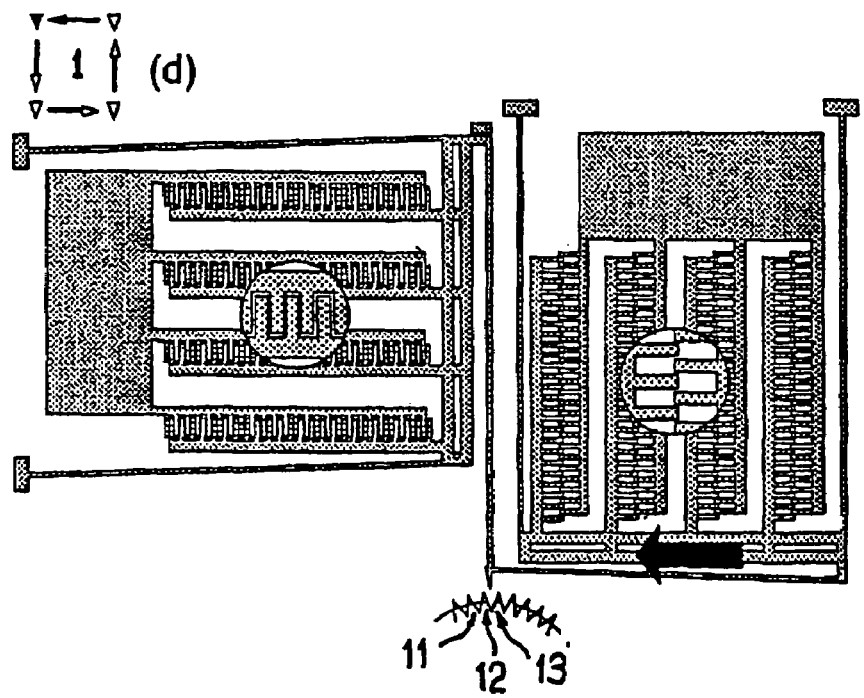

In FIG. 3D, the tangential actuating module 202 is at rest. The tooth 250 is then displaced tangentially to the wheel 10, in an anticlockwise direction (as indicated by the arrow) to be positioned opposite to teeth 11 and 12.

The stage shown in FIG. 3A is then repeated. The radial actuating module 201 and the tangential actuating module 202 are again at rest. The driving tooth 250 is then displaced toward the wheel and positioned between teeth 11 and 12 of the latter.

The hysteresis movement of the driving tooth 250 alternates between the driving phases (FIGS. 3A and 3B) and disengaging phases (FIGS. 3C and 3D). This movement allows the driving tooth 250 to mesh with the successive teeth of the wheel 10 and so to drive the wheel 10 in a stepped rotating motion in a clockwise direction. The wheel 10 is driven in rotation, and it does this through low-amplitude excursions of the driving element (of the order of one micrometre).

FIG. 4 represents the hysteresis movement to which the tooth 250 is subjected in relation to the wheel during a cycle.

FIGS. 5A to 5D show the positions A, B, C and D adopted by the driving tooth 250 in relation to the teeth of the wheel. This figure also illustrates the elementary advance Δ of the wheel 10 generated by one cycle of movement of the tooth 250.

FIGS. 6A to 6D show the addressing signals applied to the electrodes 224 and 223 of the tangential 202 and radial 201 actuating modules. These are periodic pulse-type signals, with the control signal of the electrode 223 being phase-shifted by a quarter of a period in relation to the control signal of the electrode 224.

The frequency of the addressing signals is dependent on the pitch Δ of the toothed wheel 10 and of its diameter. As an example, if we consider that the wheel 10 is connected to the second hand, the addressing frequency of the actuating modules is of the order of 10 Hz. The addressing frequencies will be divided by 60 and 720 respectively for the minute and hour hands.

The actuating modules 201 and 202 can be controlled by other types of periodic signal that are phase shifted in relation to each other by strictly between 0 and a half period.

The stages of a process for the manufacture of the clock device using a SOI technique (Silicon-On-Insulator) will now be described.

Figure 7A:
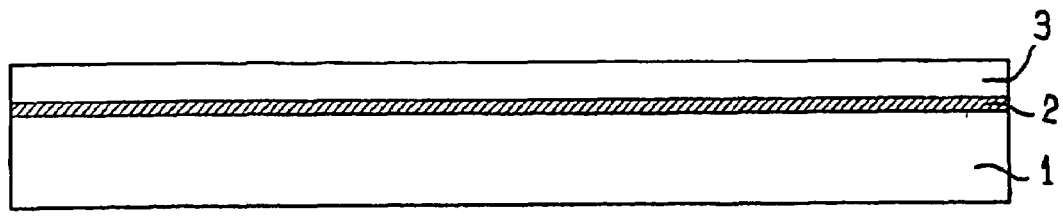
FIGS. 7A to 7D illustrate the stages of a process of manufacture of the clock device using an SOI technique.

In a first stage of manufacture shown in FIG. 7A, a block is formed by depositing onto a silicon substrate layer 1 with a thickness of the order of 360 microns, a layer of silicon oxide 2 with a thickness of about 2 microns and then a layer of silicon 3 with a thickness of the order of 50 to 100 microns.

Figure 7B:
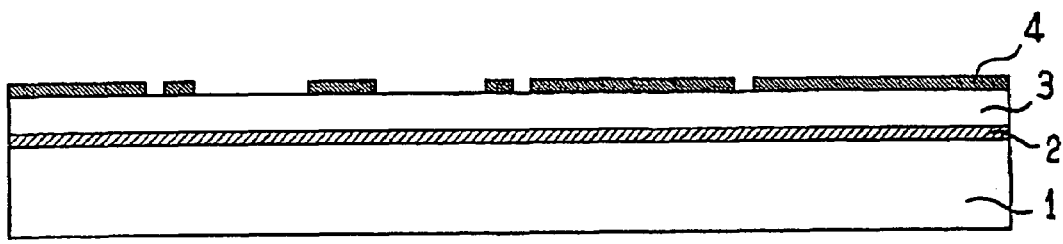

In a second stage shown in FIG. 7B, onto this block is deposited a layer of resin 4 in a pattern delimiting the various elements of the clock device. This resin layer 4 forms a mask which is intended to protect certain parts of the block. The resin is conventionally deposited by means of a photolithography technique which is used to define flat geometrical shapes by spraying, with a precision of the order of one micrometre.

Figure 7C:
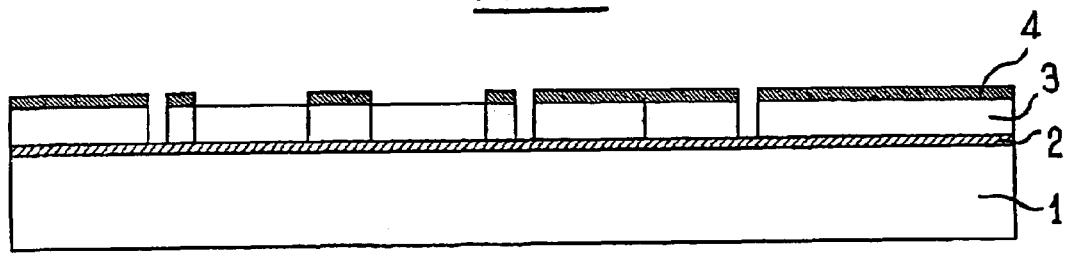

In a third stage shown in FIG. 7C, the parts of the block not protected by the mask are etched down to the silicon oxide layer 2 which constitutes a stop layer. To this end, various etching techniques exist. For example, the block can be exposed to ionic bombardment (Reactive Ion Etching) which dissolves the silicon layer.

The resin layer 4 is then removed by applying a solvent.

Figure 7D:
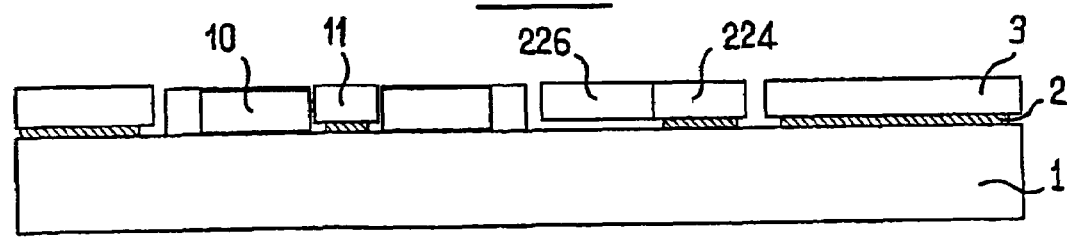

In a fourth stage shown in FIG. 7D, the silicon oxide layer 2 is dissolved by a solution of hydrofluoric acid. The dissolved areas then release the mobile parts of the mechanism (wheel 10, mobile combs 236, rods). The wheel 10 is completely freed from the substrate layer 1. It is held in its housing by a fixed central axle 11 which constitutes its axis of rotation.

The clock device can also be manufactured using an HARPSS technique (High Aspect Ratio combined Poly and Single-crystal Silicon).

Figure 8A:
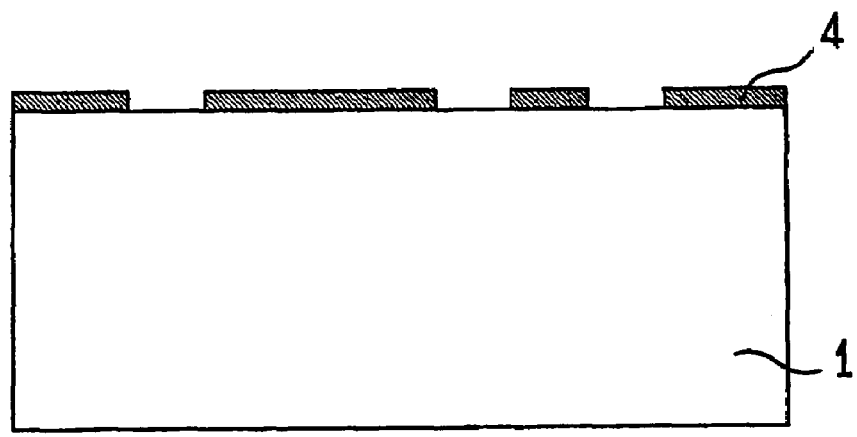
FIGS. 8A to 8H illustrate stages of a process of manufacture of the clock device using an HARPSS technique.

In a first stage of manufacture, shown in FIG. 8A, a block composed of a silicon layer or wafer 1 is covered with a resin layer 4 in a pattern that determines the shapes of the internal structure of the various elements of the future clock device.

Figure 8B:
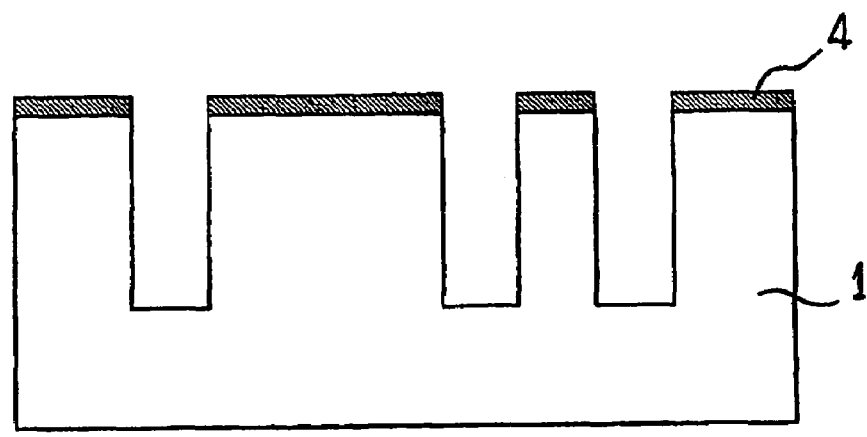

In a second stage, shown in FIG. 8B, the unprotected parts of the block are etched. A constraint in the use of the HARPSS technology is that the patterns must have an identical width everywhere in order to guarantee a constant etching depth over the whole surface of the wafer (about 50 to 100 microns).

The resin layer 4 is then removed by applying a solvent.

Figure 8C:
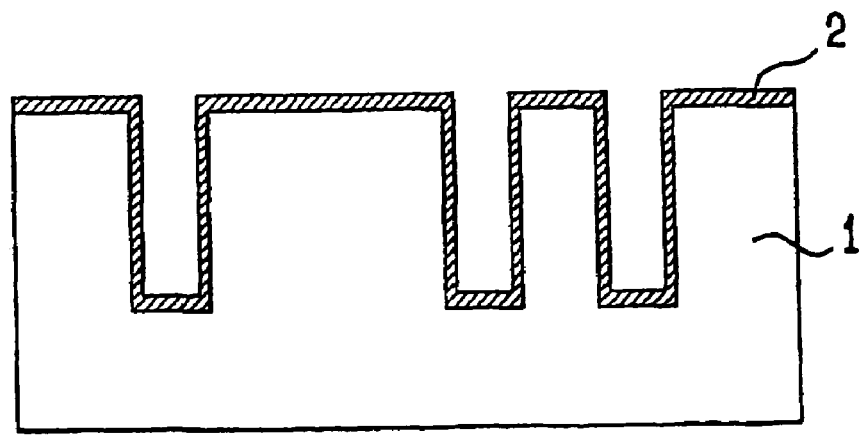

In a third stage shown in FIG. 8C, the wafer is covered with a silicon oxide layer 2 of about 1 micron in thickness. This silicon oxide layer covers the vertical walls of the etched patterns and constitutes a stop layer.

Figure 8D:
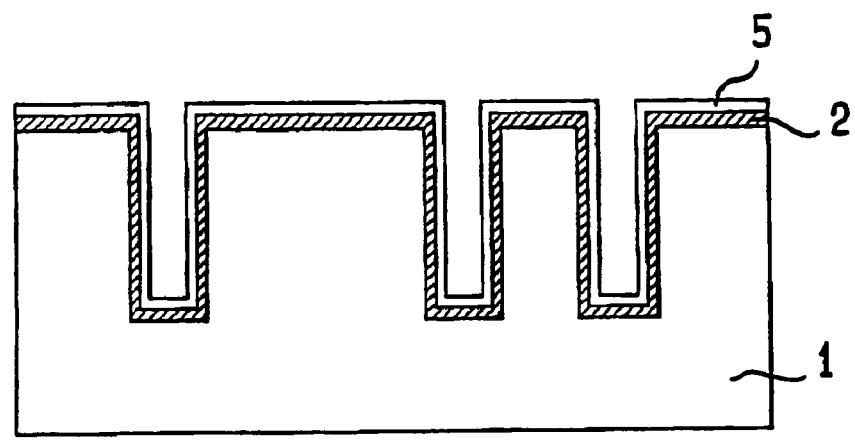

In a fourth stage, shown in FIG. 8D, we deposit onto the silicon oxide layer 2 a layer of nitride 5 with a thickness of 0.5 microns, intended to isolate the future elements of the clock device from the substrate and also from each other.

Figure 8E:
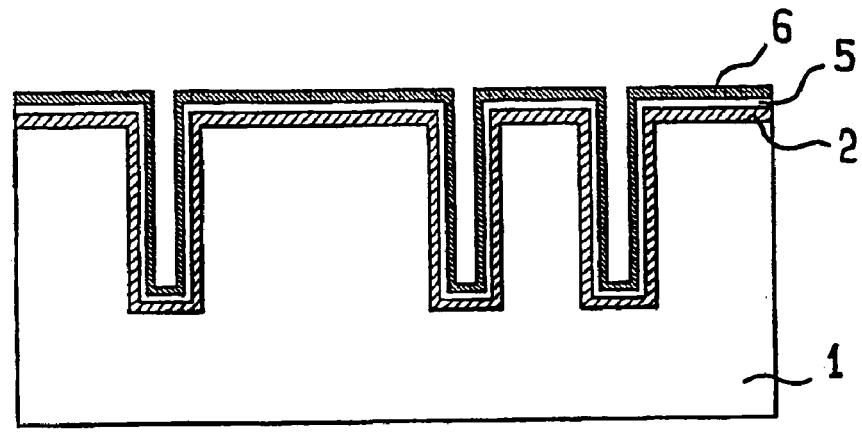

In a fifth stage, shown in FIG. 8E, a first deposit of polysilicon 6 is laid on the nitride layer 5, this first deposit being intended to cover the vertical walls of the etched patterns.

Figure 8F:
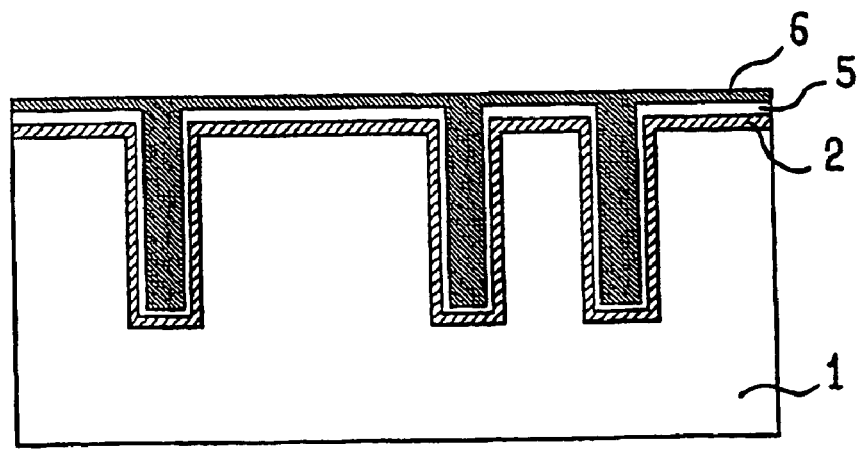

In a sixth stage, shown in FIG. 8F, a second deposit of polysilicon 6 is laid on in order to fill in the spaces formed by the etched patterns and to complete the vertical structure.

The deposition of polysilicon in two stages enables us to ensure complete doping of the polysilicon layer over the full height of the etched patterns.

Figure 8G:
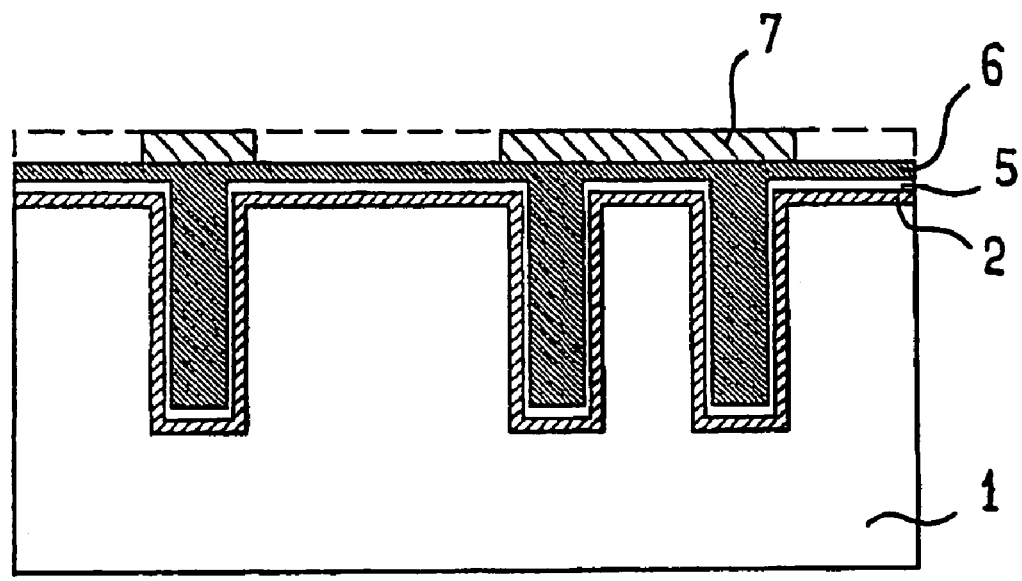

In a seventh stage, shown in FIG. 8G, the wafer is covered with a resin layer 7 in a pattern that delimits the various elements of the clock device.

Figure 8H:
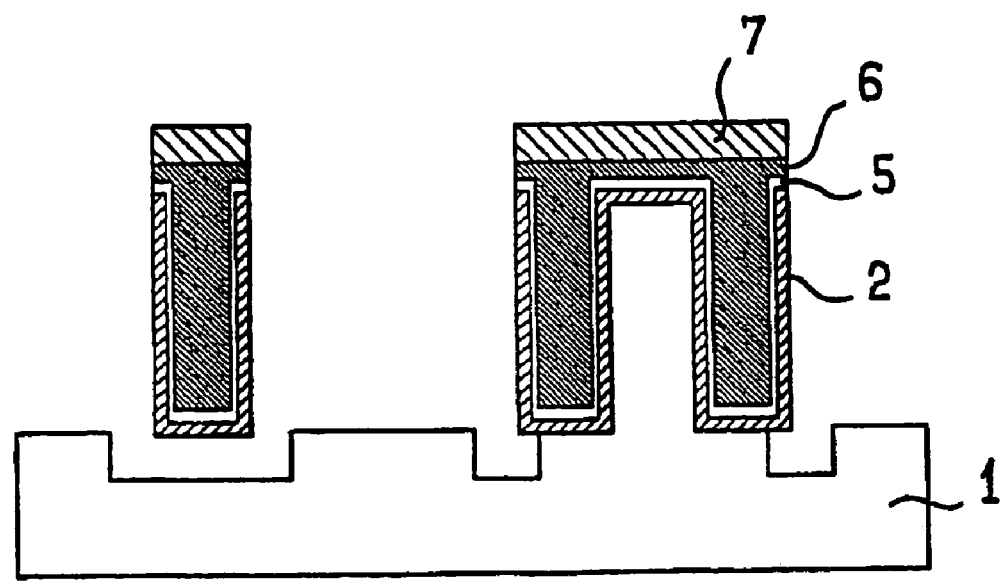

In an eighth stage, shown in FIG. 8H, the parts of the block not protected by the resin mask 7 are etched. The vertical layer of silicon oxide 2 constitutes the stop walls that limit the etching action. This silicon oxide layer also allows the wafer under the vertical structures to be etched so as to detach the mobile parts of the mechanism (wheel, mobile combs, rods).

This present invention can find many applications, such as the motor of a chronometer, for example.

This present invention also allows the powering of actuators at high frequency. As a result, it allows rotation at a speed of several thousands of revolutions per minute.

This present invention is particularly well suited to the creation of devices as previously described by means of a collective process derived from integrated-circuit technology, which means that several hundred clocks are etched simultaneously in a single block of semiconductor material.

This present invention enables the conventional driving gear trains to be simplified considerably by replacing the traditional wheel trains or verniers with a single toothed wheel 10, attached to the needle (hand) to be driven.

The proposed actuating device 20 has the advantage of being reversible. In the clockwise direction of the driven element, the tangential electrostatic forces acting between the teeth of the interdigital combs are the drivers. In the anticlockwise direction, it is the elastic return forces, acting in particular on the mobile frames which are the drivers.

The proposed actuating device is connected directly to the driven element and it also has a low energy consumption.

Figure 9:
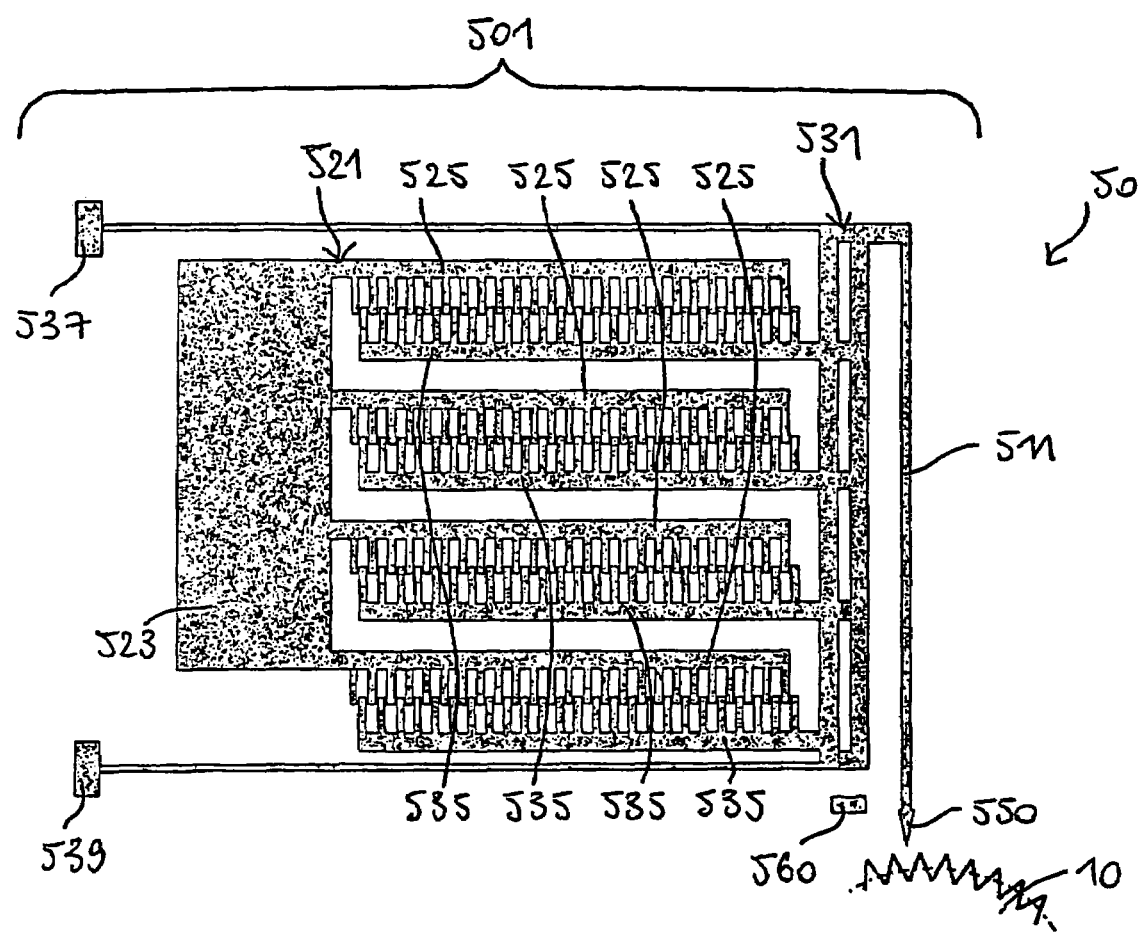
FIG. 9 represents a referencing actuator capable of being used in an implementation variant according to an embodiment of the invention.

FIG. 9 represents a referencing actuator 50 capable of being used in combination with a driving actuator. The referencing actuator 50 is composed of a single radial actuating module 501 and a driving element in the form of a tooth 550. The radial actuating module 501 is similar to the radial actuating module 201 of the driving actuator 20.

The radial actuating module 501 is formed from a fixed part 521 and a mobile part 531 to which a radial rod 511 is connected.

The fixed part 521 includes a radial electrode 523 from which a set of parallel fixed combs 525 extends in a tangential direction. Each comb 525 is formed from a main rod and a series of parallel fingers or cilia connected to the rod and extending perpendicularly in relation to the latter.

The mobile part 531 includes a mobile frame 533 that has a general U shape and extends around the fixed part 521. The mobile frame 533 is connected at each of its ends to the substrate by means of embedding links 537, 539 composed of elastic suspensions. Combs 535 extend from the mobile frame 533 in a general radial direction. These combs 535 are formed from a main rod and a series of parallel fingers or cilia connected to the rod and extending perpendicularly to the latter.

The combs 525 of the fixed part 521 and the combs 535 of the mobile part 531 are positioned parallel to each other and interleaved with each other. Furthermore, each mobile comb 535 is located facing a fixed comb 525 so that their fingers mesh with each other, thus forming a pair of combs of the so-called "interdigited" type.

The driving tooth 550 has a triangular shape. It extends close to the wheel 10 with the point directed toward the wheel, in a radial direction in relation to the latter. The driving tooth 550 is thus capable of meshing with the teeth of the wheel 10.

The referencing actuator 50 also includes a stop element 560 which is used to keep the mobile part 531 at a distance from the fixed part 521 in order to prevent the mobile combs 535 from coming into contact with the fixed combs 525.

Figure 10:
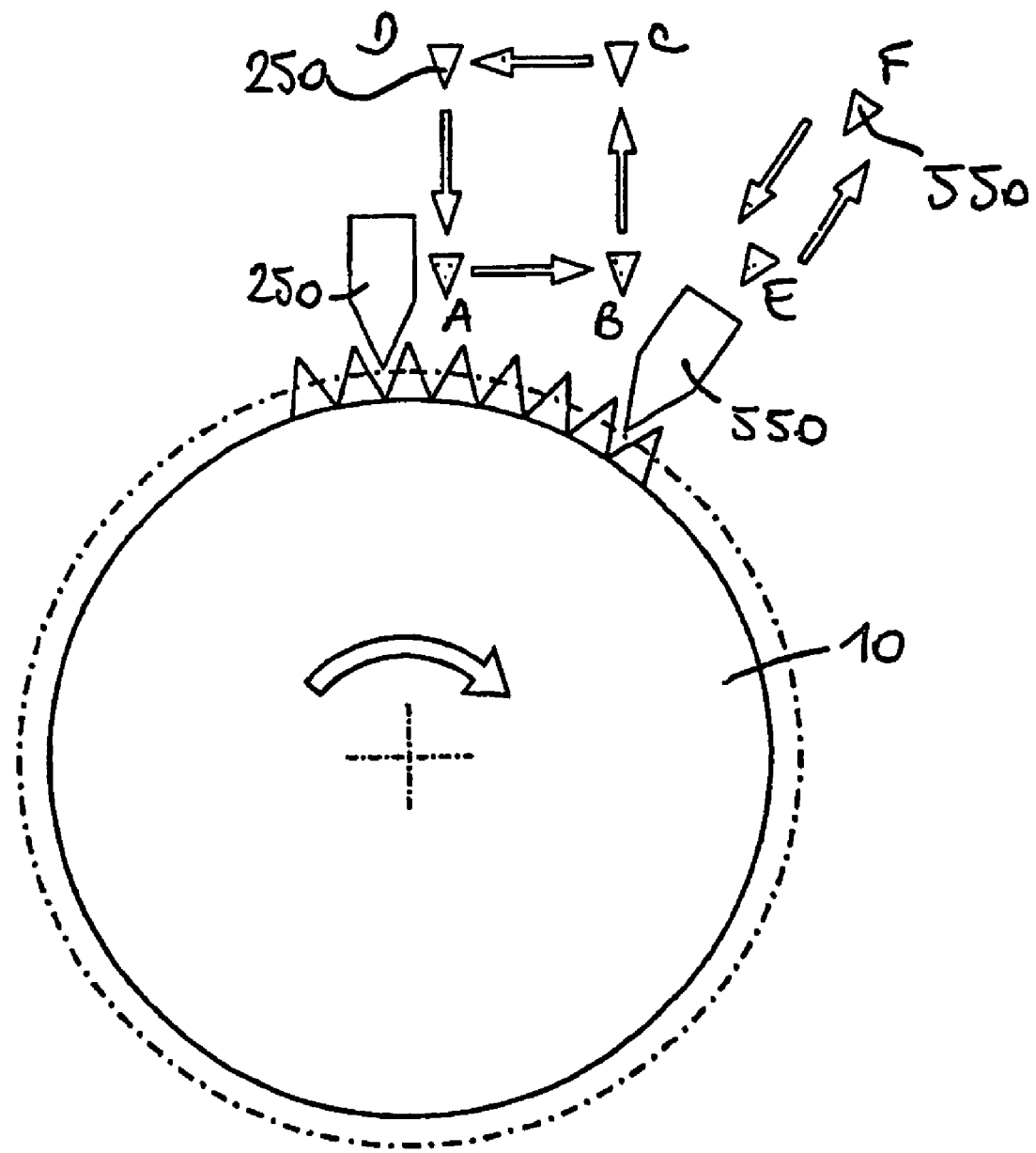
FIG. 10 schematically illustrates the use of a driving actuator like that of FIG. 2, in conjunction with a referencing actuator.

FIG. 10 schematically represents the positions adopted by the driving 250 and referencing 550 teeth when the device is in operation.

The referencing module 501 of the referencing actuator 50 is controlled in synchronisation with the elementary radial 201 and tangential 202 actuating module of the driving actuator. The function of the referencing actuator is to keep the wheel 10 in position when the tooth 250 of the driving actuator is disengaged (in positions C and D). The conjunction of the driving actuator and the referencing actuator provides precise control of the position of the wheel 10.

FIGS. 11A to 11F show the positions A, B, C and D adopted by the driving tooth 250 and the positions E and F adopted by the referencing tooth 550 in relation to the teeth of the wheel 10 during a cycle of the driving tooth 250. This figure also illustrates the elementary advance A of the wheel 10 generated by a cycle of movement of the tooth 250.

The referencing actuator 50 is controlled so as to move the tooth 550 in an alternating radial direction in relation to the wheel 10. The movement of the tooth 550 is synchronised with that of the tooth 250. When the driving tooth 250 meshes with the wheel 10 and drives the latter in rotation (FIGS. 11A and 11B), the referencing tooth 550 is disengaged (in position F). When the driving tooth 250 is disengaged (FIGS. 10C to 10F), the referencing tooth 550 is inserted between the teeth of the wheel 10 (in position E) so as to keep the wheel in its position.

Figure 6A:
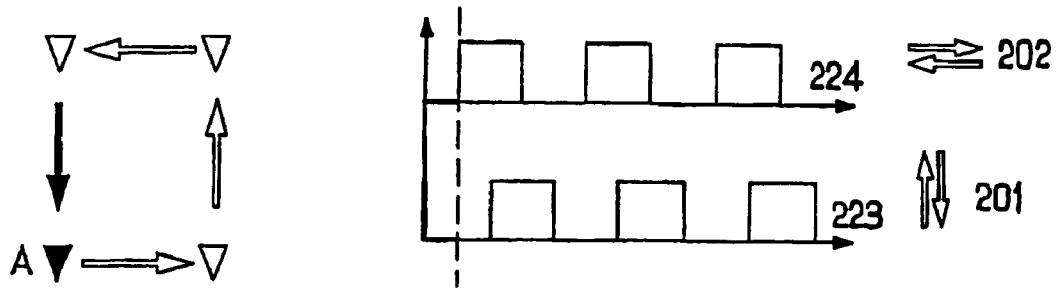
FIGS. 6A to 6D show the addressing signals applied to the elementary modules of the actuator.
Figure 6B:
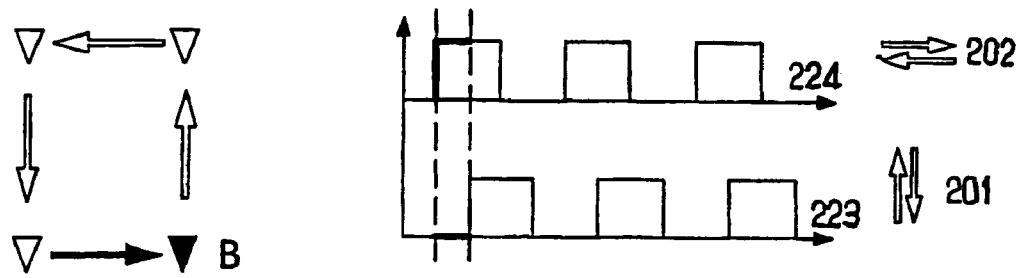
Figure 6C:
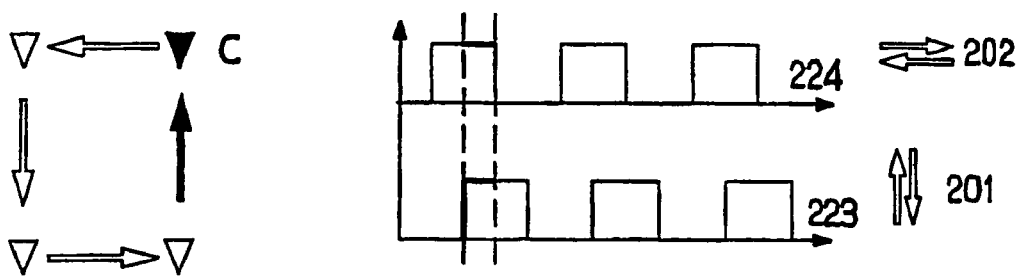
Figure 6D:
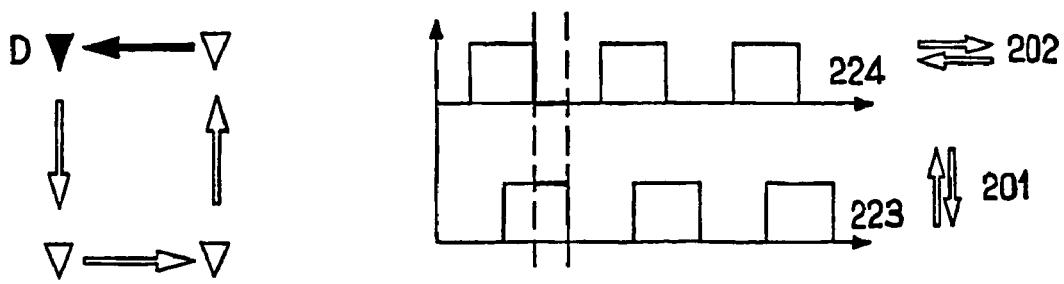
Figure 12A:
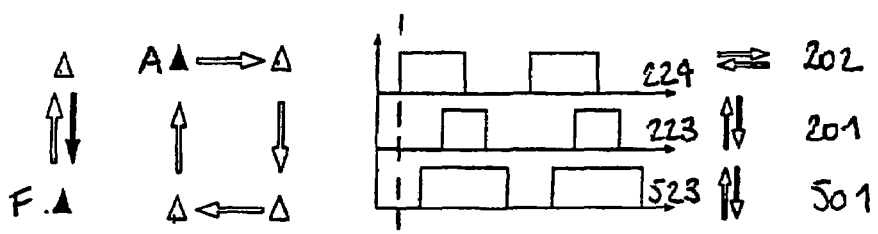
FIGS. 12A to 12F show the addressing signals applied to the elementary modules of the driving actuator and to the referencing actuator.
Figure 12B:
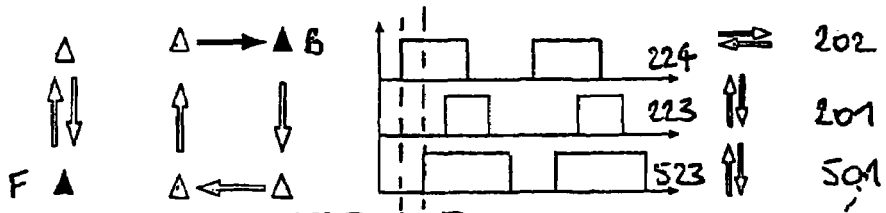
Figure 12C:
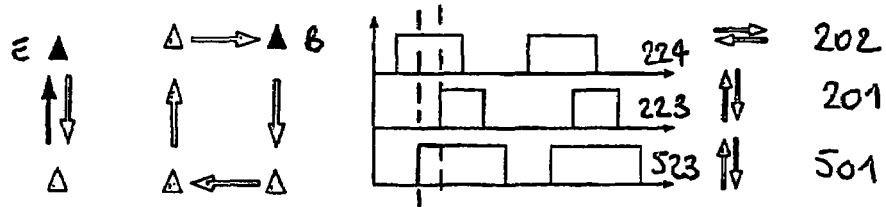
Figure 12D:
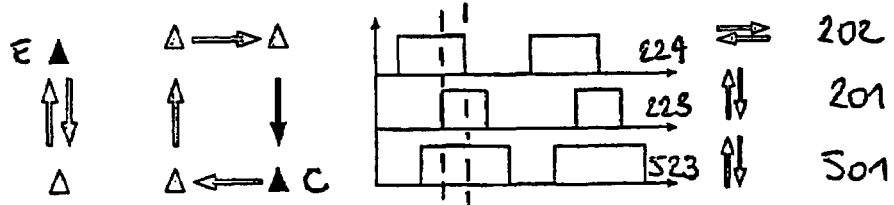
Figure 12E:
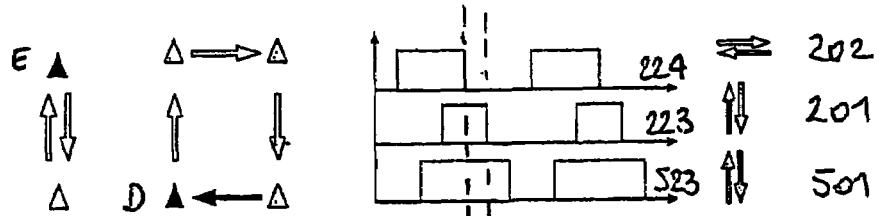
Figure 12F:
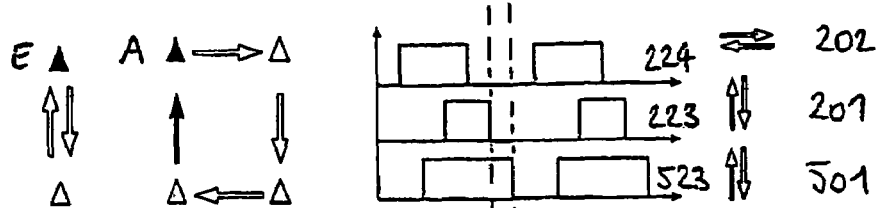

FIGS. 12A to 12F show the addressing signals applied to the electrodes 224 and 223 of the tangential 202 and radial 201 actuating modules of the driving actuator 20 and to the electrode 523 of the referencing module 501. These are periodic pulse-type signals. The control signal of electrode 223 is phase-shifted by a quarter of a period in relation to the control signal of electrode 224. A As can be seen in FIGS. 6A and 12F, the driving tooth 250 of the driving actuator 20 is in the meshed position (position A) when no signal is applied to the electrodes 224 and 223. This means that when the device is not supplied with energy, the referencing of the wheel is effected by the tooth 250 and also results in lower energy consumption.

The characteristic according to which the tooth 250 is in meshed position (position A) when the actuator 20 is at rest is linked directly to the process of manufacture of the self-assembly device. In fact, the etching pattern applied to the block of semiconductor material includes the tooth 250 in meshed position between two teeth of the wheel 10.

Figure 13:
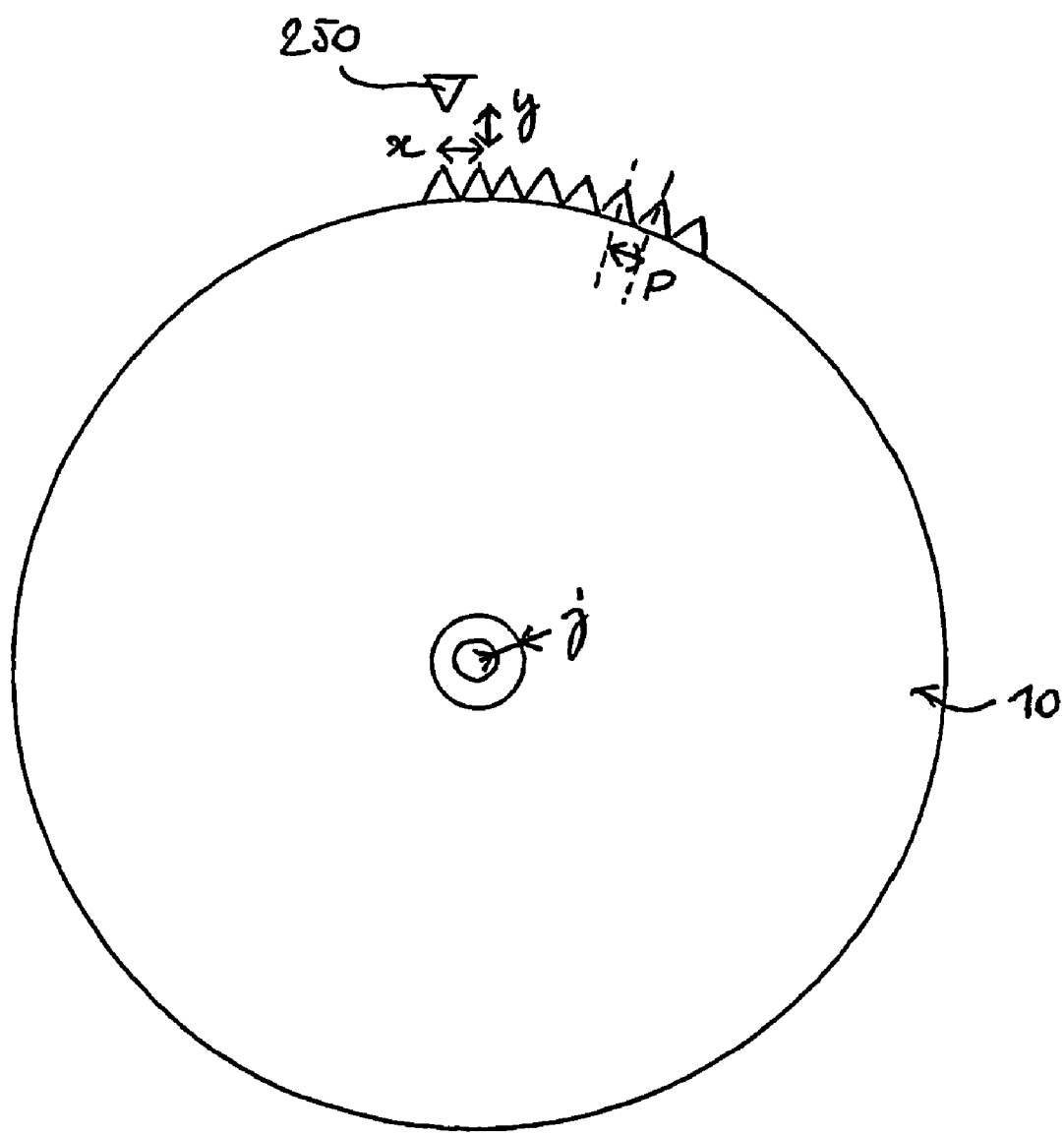
FIG. 13 represents the play j that can appear between the elements of the device using the known manufacturing techniques.

With the current techniques for the creation of MEMS devices, and especially the SOI and HARPSS techniques described earlier, a certain amount of incompressible play appears between the etched elements. As illustrated in FIG. 13, such play j exists, for example, between the toothed wheel 10 and its axle. This play is of the order of 4 µm. If the pitch P of the teeth of the wheel 10 is not sufficient, then the play j can lead to uncertainty concerning the positioning of the wheel. This is why the pitch of the wheel is chosen to prevent such uncertainty. The pitch P is preferably greater than 10 µm. In like manner, to ensure reliable operation of the device, the tangential (meshing distance) x and radial (disengaging distance) movement amplitudes are chosen to be sufficiently large. The meshing and disengaging distances x and y are greater than 10 µm.

Equally large distances are possible through the use of tangential electrostatic forces generated between the fingers of the interdigital combs of the actuators and by virtue of an etching thickness that is greater than 10 µm.

As a non-limited example, the main characteristic orders of magnitude of the devices for clocks that conform to this present invention are as follows:

Diameter of the toothed wheel 10 of the order of 2 mm (however, this diameter can be reduced to some hundreds of microns)

Pitch of the toothed wheel 10: 15 microns.

Width of the elementary cilia 226: 3 microns.

Width of the air gap (the air gap between two fingers or cilia): 2 microns.

Length of a comb: typically some hundreds of microns.

Surface area of an actuator module (radial or tangential): ~0.25 mm.²

Thickness (or altitude) of the clock (SOI layer): 50 microns.

Thickness of the substrate:—360 microns. Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised present without departing from the spirit and scope of the invention as defined by the appended claims.

The invention claimed is:

1. A micro-electromechanical system (MEMS) device, comprising:
 a driven element having a series of teeth;
 a driving element operable to engage the driven element when the driving element is in a meshed position with the series of teeth;
 a driving actuator operable to the driving element with a hysteresis-type motion to cause the driven element to move in a first direction, so as to (i) move the driving element from an initial position into the meshed position to engage the driven element, (ii) move the driving element in the first direction, causing the driven element to move in the first direction while the driving element is in the meshed position, (iii) move the driving element away from the meshed position, and (iv) cause the driving element to return to the initial position while the driving element is not in the meshed position, and (v) to repeat the motion of (i) through (iv) in sequence for so long as the driven element is to be moved in the first direction,
 wherein the driving actuator has a fixed comb and a mobile comb, each of the fixed and mobile combs including a series of fingers, the mobile comb being located opposite the fixed comb, the fingers of the fixed comb and fingers of the mobile comb meshing with each other, the mobile comb being displaceable in the first direction relative to the fixed comb by applying a potential difference between the fixed comb and the mobile comb to move the driving element in the first direction.

2. The MEMS device as claimed in claim 1, wherein the first direction is a direction parallel to a direction in which the series of fingers extend from the fixed comb and mobile comb.

3. A MEMS device according to claim 1, wherein the driving actuator includes a first actuating module operable to move the driving element in the first direction and a second actuating module operable to move the driving element in a second direction, the first direction being a tangential direction tangential to the series of teeth, the second direction being a radial direction oriented radially with respect to the series of teeth, the first and second actuating modules being controllable simultaneously to move the driving element with the hysteresis-type motion.

4. A MEMS device according to claim 3, further comprising a first flexible rod extending in the first direction to connect the first actuating module with the driving element and a second flexible rod extending in the second direction to connect the second actuating module with the driving element, the first and second actuating modules independently moving the first and second flexible rods, respectively, to move the driving element with the hysteresis-type motion.

5. A MEMS device according to claim 3, wherein the first and second actuating modules are controllable by first and second periodic signals, respectively.

6. A MEMS device according to claim 5, wherein the second periodic signal is shifted in phase relative to the first periodic signal by less than about half of a period of the first periodic signal.

7. A MEMS device according to claim 1, wherein the driving actuator is operable to maintain the driving element in the meshed position when no signal is applied to the actuator.

8. A MEMS device as claimed in claim 1, further comprising
 a referencing element operable to engage the driven element when the referencing element is in a meshed position with the series of teeth,
 a referencing actuator operable to move the referencing element into the meshed position in synchronism with the hysteresis-type motion of the driving element to selectively engage the referencing element with the driven element to maintain a position of the driven element from moving when the driving element is disengaged from the driven element.

9. A MEMS device according to claim 5, wherein the referencing actuator is controllable by one or more periodic signals synchronized with the first and second periodic signals.

10. A MEMS device according to claim 1, wherein the driven element includes a wheel and the series of teeth are disposed at an exterior surface of the wheel.

11. A MEMS device according to claim 10, wherein the wheel is directly attached to an indicator such that the indicator is movable by the driving element, the indicator including at least one of a needle or a hand.

12. A micro-electromechanical system (MES) device, comprising:
 a driven element having a series of teeth;
 a driving element operable to engage the driven element when the driving element is in a meshed position with the series of teeth;
 a driving actuator operable to (i) move the driving element with a hysteresis-type motion from an initial position into the meshed position between first and second adjacent teeth of the series of teeth to engage the driven element, (ii) move the driving element in a first direction, causing the driven element to move in the first direction only so long as the driving element is in the meshed position between the first and second adjacent teeth, (iii) move the driving element away from the meshed position, (iv) cause the driving element to return to the initial position while the driving element is not in the meshed position, and (v) repeat steps (i) through (iv) in sequence in a modified manner by (i) moving the driving element into the meshed position between third and fourth adjacent teeth of the series of teeth, the third and fourth teeth being different from the first and second adjacent teeth, and by (ii) moving the driving element in the first direction, causing the driven element to move in the first direction only so long as the driving element is in the meshed position between the third and fourth adjacent teeth, wherein the driving actuator has a fixed comb and a mobile comb, each of the fixed and mobile combs including a series of fingers, the mobile comb being located opposite the fixed comb, the fingers of the fixed comb and fingers of the mobile comb meshing with each other, the mobile comb being displaceable in the first direction relative to the fixed comb by applying a potential difference between the fixed comb and the mobile comb to move the driving element in the first direction.

* * * * *

UNITED STATES PATENT AND TRADEMARK OFFICE
CERTIFICATE OF CORRECTION

PATENT NO. : 7,592,737 B2 Page 1 of 1
APPLICATION NO. : 10/548214
DATED : September 22, 2009
INVENTOR(S) : Bourbon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 161 days.

Signed and Sealed this

Twenty-first Day of September, 2010

David J. Kappos
*Director of the United States Patent and Trademark Office*

UNITED STATES PATENT AND TRADEMARK OFFICE
CERTIFICATE OF CORRECTION

Page 1 of 1

PATENT NO. : 7,592,737 B2
APPLICATION NO. : 10/548214
DATED : September 22, 2009
INVENTOR(S) : Gilles Bourbon et al.

It is certified that error appears in the above-identified patent and that said Letters Patent is hereby corrected as shown below:

Column 11, line 27 after "to" insert --move--.
Column 12, line 42 "(MES)" should read --(MEMS)--.

Signed and Sealed this
Twenty-second Day of February, 2011

David J. Kappos
*Director of the United States Patent and Trademark Office*